US 6,658,389 B1

(12) United States Patent
Alpdemir

(10) Patent No.: US 6,658,389 B1
(45) Date of Patent: Dec. 2, 2003

(54) SYSTEM, METHOD, AND BUSINESS MODEL FOR SPEECH-INTERACTIVE INFORMATION SYSTEM HAVING BUSINESS SELF-PROMOTION, AUDIO COUPON AND RATING FEATURES

(76) Inventor: Ahmet Alpdemir, 2318 Oak Flat Rd., San Jose, CA (US) 95131

( * ) Notice: Subject to any disclaimer, the term of this patent is extended or adjusted under 35 U.S.C. 154(b) by 0 days.

(21) Appl. No.: 09/534,700

(22) Filed: Mar. 24, 2000

(51) Int. Cl.[7] .............................................. G10L 15/00
(52) U.S. Cl. ......................... 704/275; 704/270; 705/15
(58) Field of Search ................................ 704/246, 251, 704/270, 273, 275; 705/15, 26; 379/88.01, 88.22

(56) References Cited

U.S. PATENT DOCUMENTS

| 4,674,041 A | 6/1987 | Lemon et al. |
| 4,791,281 A | 12/1988 | Johnsen et al. |
| 4,882,675 A | 11/1989 | Nichtberger et al. |
| 5,117,355 A | 5/1992 | McCarthy |
| 5,185,695 A | 2/1993 | Pruchnicki |
| 5,193,056 A | 3/1993 | Boes |
| 5,202,826 A | 4/1993 | McCarthy |
| 5,237,499 A | 8/1993 | Garback |
| 5,249,044 A | 9/1993 | Von Kohorn |
| 5,287,268 A | 2/1994 | McCarthy |
| 5,305,195 A | 4/1994 | Murphy |
| 5,305,197 A | 4/1994 | Axler et al. |
| 5,353,218 A | 10/1994 | De Lapa et al. |
| 5,380,991 A | 1/1995 | Valencia et al. |

(List continued on next page.)

OTHER PUBLICATIONS

*Dialogic—Products: Alphabetical Listing*, 19 pp. (available @ http://www.dialogic.com; text down loaded Mar. 11, 2000).

*Dialogic—ANTARES DSP Platform & Speech Technologies*, 4 pp. (available @ http://www.dialogic.com; text downloaded Mar. 11, 2000).

*Dialogic—ANTARES Platform Overview*, 10 pp. (available @ http://www.dialogic.com; text downloaded Mar. 11, 2000).

(List continued on next page.)

*Primary Examiner*—Daniel Abebe
(74) *Attorney, Agent, or Firm*—Dorsey & Whitney LLP

(57) ABSTRACT

The invention provides a system, method, and business model for an information system and service having business self-promotion, audio coupon, ratings, and other features. A business or organization in which consumers call into a service using an ordinary telephone, PC, PDA, or other information appliance, and make requests in plain speech for information on goods and/or services, and the service provides responses to the request in plain speech in real-time. Provides an operating model for a telephone-based audio-interfaced goods and services information and referral service having merchant self-promotion features, including database provider storing merchant information; an interface for inputting merchant information into the database and for retrieving and editing the information; and an interface for inputting voice commands and data and for receiving merchant information and processed information from the database in response to the input voice commands and data. The invention provides a system including: a speech-to-text conversion engine converting speech-based input commands and data received from an external device over a communication link into text-based commands and data; a data base storing a plurality of data items; a search engine searching the database for a particular data item in response to the text-based command and data; a text-to-speech conversion engine generating a speech-based representation of the particular data item identified in the database search; and a speech server for communicating the speech-based representation of the particular data item to the external device.

66 Claims, 6 Drawing Sheets

U.S. PATENT DOCUMENTS

| | | | |
|---|---|---|---|
| RE34,915 | E | 4/1995 | Nichtberger et al. |
| 5,420,606 | A | 5/1995 | Begum et al. |
| 5,502,636 | A | 3/1996 | Clarke |
| 5,515,098 | A | 5/1996 | Carles |
| 5,557,518 | A | 9/1996 | Rosen |
| 5,761,648 | A | 6/1998 | Golden et al. |
| 5,799,063 | A | 8/1998 | Krane ........................ 379/67 |
| 5,884,262 | A | 3/1999 | Wise et al. ................. 704/270 |
| 5,884,266 | A * | 3/1999 | Dvorak ....................... 704/275 |
| 5,903,652 | A * | 5/1999 | Mital .......................... 380/25 |
| 5,915,001 | A * | 6/1999 | Uppaluru ................. 379/88.22 |
| 5,991,739 | A * | 11/1999 | Cupps et al. ................. 705/26 |
| 5,995,155 | A * | 11/1999 | Schindler et al. ........... 348/461 |
| 6,055,513 | A * | 4/2000 | Katz et al. .................... 705/26 |
| 6,101,483 | A * | 8/2000 | Petrovich et al. ............. 705/26 |
| 6,134,548 | A * | 10/2000 | Gottsman et al. ............. 705/26 |
| 6,446,076 | B1 * | 9/2002 | Burkey et al. .............. 707/102 |

OTHER PUBLICATIONS

*Dialogic—Introduction to Speech Technologies,* 25 pp (available @ http://www.dialogic.com; text downloaded Mar. 11, 2000).

*Dialogic—CoolApps,* 5 pp. (available @ http://www.dialogic.com; text downloaded Mar. 11, 2000.

*Dialogic—ANTARES,* 9 pp. (available @ http://www.dialogic.com; text downloaded May 11, 2000).

*Dialogic—ANTARNS Software Development Kit,* 10 pp. (available @ http://www.dialogic.com; text downloaded Mar. 11, 2000).

*Dialogic—The Business Case For Telephony–Based Automatic Speech Recognition and Text–To–Speech,* 23 pp. (available @ http://www.dialogic.com; text downloaded Mar. 11, 2000).

*Dialogic—Who Needs Multiple Speech Technologies?* 9 pp. (available @ http://www.dialogic.com; text downloaded Mar. 11, 2000).

*Dialogic—Automatic Speech Recognition,* 3 pp. (available @ http://www.dialogic.com; text downloaded Mar. 11, 2000).

VoiceXML Forum,"Voice extensible markup language" 101 pp. (Version 1.00, Mar. 7, 2000).

* cited by examiner

SYSTEM, METHOD, AND BUSINESS MODEL FOR SPEECH-INTERACTIVE INFORMATION SYSTEM HAVING BUSINESS SELF-PROMOTION, AUDIO COUPON AND RATING FEATURES

FIELD OF THE INVENTION

This invention pertains generally to voice-based or speech-based interactive electronic commerce, and more particularly to systems, methods, and methods of doing business for providing automated interactive information from a business or organization to a consumer in need of goods and/or services. The invention pertains even more particularly to systems, methods, and methods of doing business for providing automated speech driven query and response with business or event self-promotion features relative to businesses and events over ordinary wired or wireless telephone systems, PC systems, Personal Data Assistants (PDAs), and other communication and information appliances and devices.

BACKGROUND

Locating business establishments, such as for example a restaurant satisfying the particular need, has hereto for generally required access to printed directory listings, or more recently access to the World Wide Web using a personal computer. The availability of such references is frequently quite limited at the time the consumer desires to avail themselves of particular goods or services. For example, an out-of-town visitor driving in their automobile and approaching San Francisco might decide to stop and have dinner in a fine Italian restaurant and more particularly might like to have dinner in a fine Italian restaurant located in the particular area of the city. That visitor would likely not have a printed directory in their automobile or mobile access to the internet to search for a restaurant satisfying their current need. Therefore, the visitor would likely either have to stop and asked for recommendations or drive around until a restaurant satisfying their needs had been located. This is clearly inefficient, and the visitor may not have the dining experienced a expected if the restaurant they happen to see well driving turns out to have poor quality food, poor service, or both.

An analogous dilemma arises for other goods and services, whether provided to the local residents or to a visitor. Frequently information is not available to a consumer when he or she needs such information, and with the proliferation of a fast mobile lifestyle, there exists and need to provide such consumer information with readily available information appliances, such as conventional telephones, site other phones, or other pocket or mobile devices that can provide connectivity to a service at minimum cost.

Frequently such device will have only sparse input/output capabilities. For example, a cellular telephone will typically have only a few display lines presenting text or symbolic data to a user, but has substantial audio input and audio output capability that can be used by the consumer.

Heretofore, speech-to-text conversion has generally been limited to word processing and or computer or control applications as the has required fairly substantial processing power and memory within a computer device. For example, speech to text conversion products made by Dragon Systems generally require an Intel Pentium II or III microprocessor running in excess of 450 MHz and 128 MB of memory. This technology is not available in conventional or mold will telephones at this time. Text-to-speech conversion has been known but has not been utilized to provide an interactive interface between consumers and consumer information from telephone systems.

Furthermore, even for systems which provided some degree of consumer information over the telephone, such systems have either not attempted to generate business revenues through their operation, or have been unsuccessful in generating significant revenue in this manner. In part the lack of revenue success has been due to a low level of business participation in such systems, the inability of a business to control or modify their message in response to short-term business needs or to sell promote their businesses, as well as the lack of a particular incentive for a consumer to par take all of the information offered by the service. In fact, there may frequently have been a cost associated access to conventional information and referral services by consumers, even if only by virtue of the directory assistance by local telephone service providers.

Some conventional systems and methods have been limited to playback of recorded audio or audio playback corresponding to the content of web pages; but such systems have not integrated internet or web-based interactions with voice or telephone based information provision.

Therefore, there remains a need for a method of doing business, an information and referral service providing easy access by businesses and consumers, as well as providing business self promotion and consumer feedback features that encourage use, generate revenues, and provide incentives for use by both businesses and consumers.

SUMMARY

The invention provides a system, method, and business model for an information system and service having business self-promotion features. In one aspect, the inventive business model is directed to a business in which consumers call into a service using an ordinary telephone, PC, PDA, or other information appliance, and make requests in plain speech for information and positive referrals on goods and/or services, and the service provides responses to the request in plain speech in real-time over the same telephone, PC, PDA, or other information appliance. The business model may further include providing a facility for a business to communicate a self-promotion of the business to the requestor, as well as providing an audio promotional coupon (or other promotional item) to a requestor when the requestor completes a call to a business using the service.

In another aspect, the invention provides an operating model for a telephone-based audio-interfaced goods and services information and referral service having merchant self-promotion features, comprising: an information database provider storing merchant information; a merchant interface for inputting merchant information into the database and for retrieving and editing the information; and a consumer interface for inputting voice commands and data and for receiving merchant information and processed information from the database in response to the input voice commands and data. The operating method may provide that the consumer interface comprises a telephone handset, and/or that the consumer also inputs non-voice commands and data from a keypad on the telephone handset. The operating model may also provide that the telephone handset comprises a mobile telephone.

In another aspect, the invention provides a system comprising: a speech-to-text conversion engine converting speech-based input commands and data received from an external device over a communication link into text-based commands and data; a data base storing a plurality of data items; a database search engine searching the database for a particular data item in response to the text-based command and data; a text-to-speech conversion engine generating a speech-based representation of the particular data item identified in the database search; and a speech server for communicating the speech-based representation of the particular data item to the external device.

In another aspect the invention provides audio coupons that operate as incentives for consumers to use the inventive system. In still another aspect, the invention provides system and methods for submitting and retrieving ratings for goods and/or services.

The invention also provides methods, computer software, and computer software program products that interoperate with the inventive systems and methods.

BRIEF DESCRIPTION OF THE DRAWINGS

Additional advantages and features of the invention will become readily apparent upon reading the following detailed description and appended claims when taken in conjunction with reference to the following drawings, in which:

DETAILED DESCRIPTION OF EMBODIMENTS OF THE INVENTION

Figure 1:
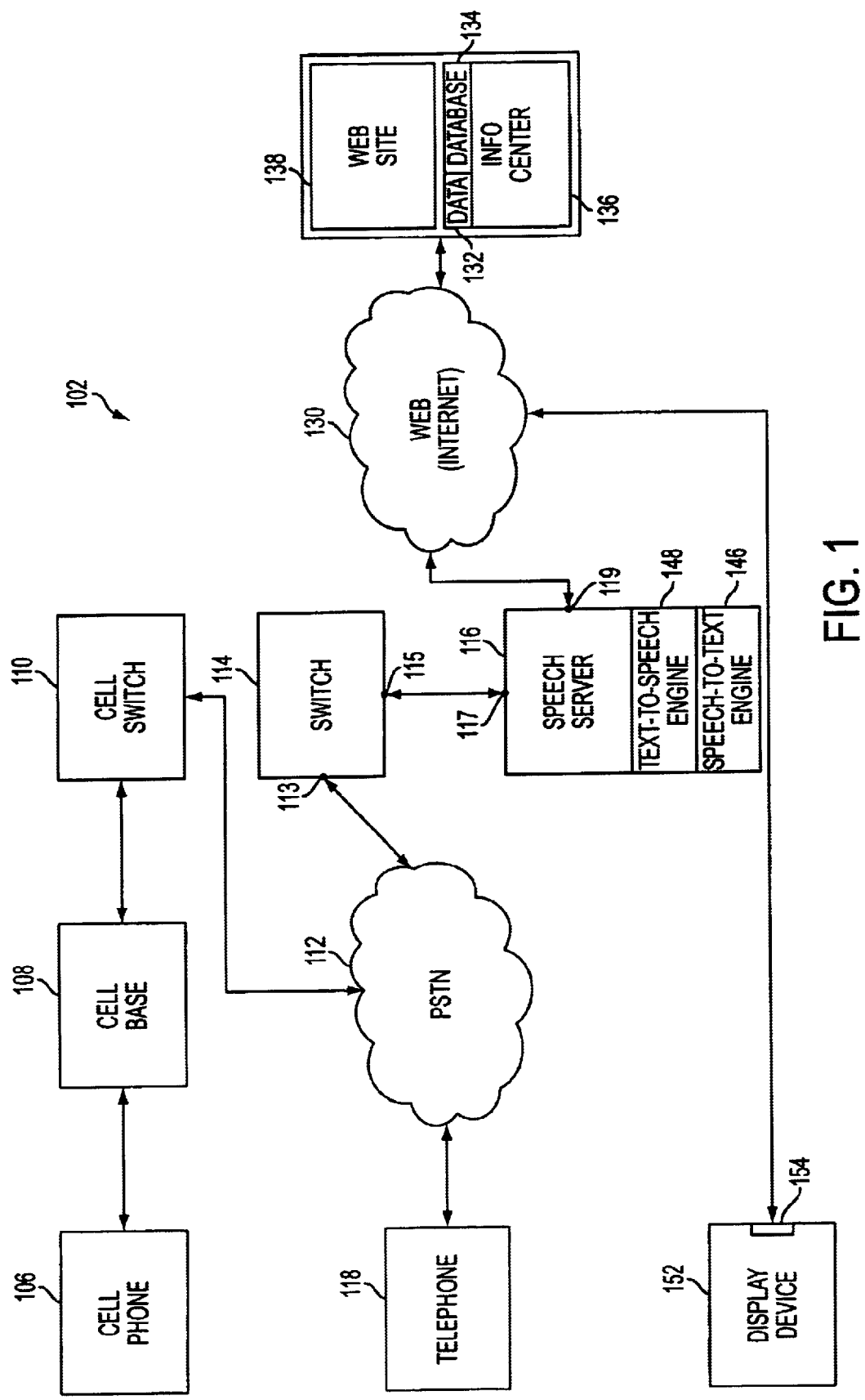
FIG. 1 is a diagrammatic illustration showing an exemplary embodiment of the inventive system.

FIG. 1 shows the high level system architecture 102 and consumer user (or caller) 101 access points for a preferred embodiment of the invention. A cellular phone 106 (or other wireless device), standard telephone 118, either an analog (POTS) or digital, can be connected to the architecture 102 using a standard telecommunication link 120, such as a standard telephone line 122, ISDN line 124, cable 126 or DSL line 128. For a cellular phone 106, it is understood that there is a cellular base station 108 and a cellular switch 110 interposed between the cellular telephone 106 and the PSTN 112. The incoming call 130 from the cell phone 106 or the telephone 118 goes through a PSTN 112 and telephone switch 114 and gets picked up by the Speech server 116, which is connected on one side 117 to the telephone switch 115, and on the other side 119 to a computer network 130 such as for example the Internet.

The user (or caller) 101 can access the information or data 132 that resides in a database 134 within the Information Center 136 and the Web Site 138 through interactive voice commands 140 and/or through keypad presses 142 on the caller's 101 device, such as on the cellular telephone 106 or standard wired telephone 118. In a preferred embodiment of the invention, only the caller's voice commands are used.

The caller's voice commands 140 are recognized and translated into one of the variations of Voice Extensible Markup Language (VXML, VoiceXML, or VOXML) commands 144 by the Speech Server 116 using a speech-to-text conversion engine 146 and once translated into VXML are used to retrieve the information 132 from the Information Center 136 database 134. VXML is an extension or elaboration on the XML (Extensible Markup Language) standard known to workers in the art and not described in greater detail here. Information concerning the VXML Forum is available on the world-wide-web at http://www.vxmlforum.org/ and Version 1.0 of the VoiceXML specification dated Mar. 7, 2000 which is hereby incorporated by reference is available in Adobe Acrobat format at http://www.vxmlforum.org/specs/VoiceXML-100.pdf.

Once the data 132 is retrieved and transmitted back to the Speech Server 116, the text information from the data 132 is converted to speech using a text-to-speech conversion engine 148 within the speech server 116 and played back to the caller 101 using the caller's device 106, 118. Speech server 116 also generates and plays back (presents) pre-recorded or synthesized menu commands 150 to the caller. The system architecture connects 102 the information database 134 to the Internet 130 (or other local or global network of computers and/or information appliances) which can also be accessed with a display device 152 such as a personal computer (PC) equipped with a modem 154 (wired or wireless), a smart phone 156, a PDA or palmtop device 158 or any computer or other information appliance or device that can be connected to the Internet (or other local or global network) with the ability to display standard Hypertext Markup Language (HTML) pages or other formats interpretable by the computer 152.

It is noted that although reference is made to several current industry standard data and information formats and protocols, such as HTML, XML, and VXML, the inventive structure and method are not limited to these particular formats and/or protocols or to the versions of these protocols in existence at the time the invention was made as those workers having ordinary skill in the art will appreciate the capabilities and features provided by these formats and protocols may be provided in other ways and that future versions of these formats and protocols will also support the inventive structure and method.

Embodiments of the inventive system may desirably incorporate and utilize natural language speech recognition. In such implementations, the user can naturally speak and the system interprets the user's speech to extract the request or inquiry. The provides additional flexibility for a user as that user does not need to know any particular commands or request rules or syntax. Natural speech processing and artificial intelligence are known in the art and not described in greater detail here.

Figure 2:
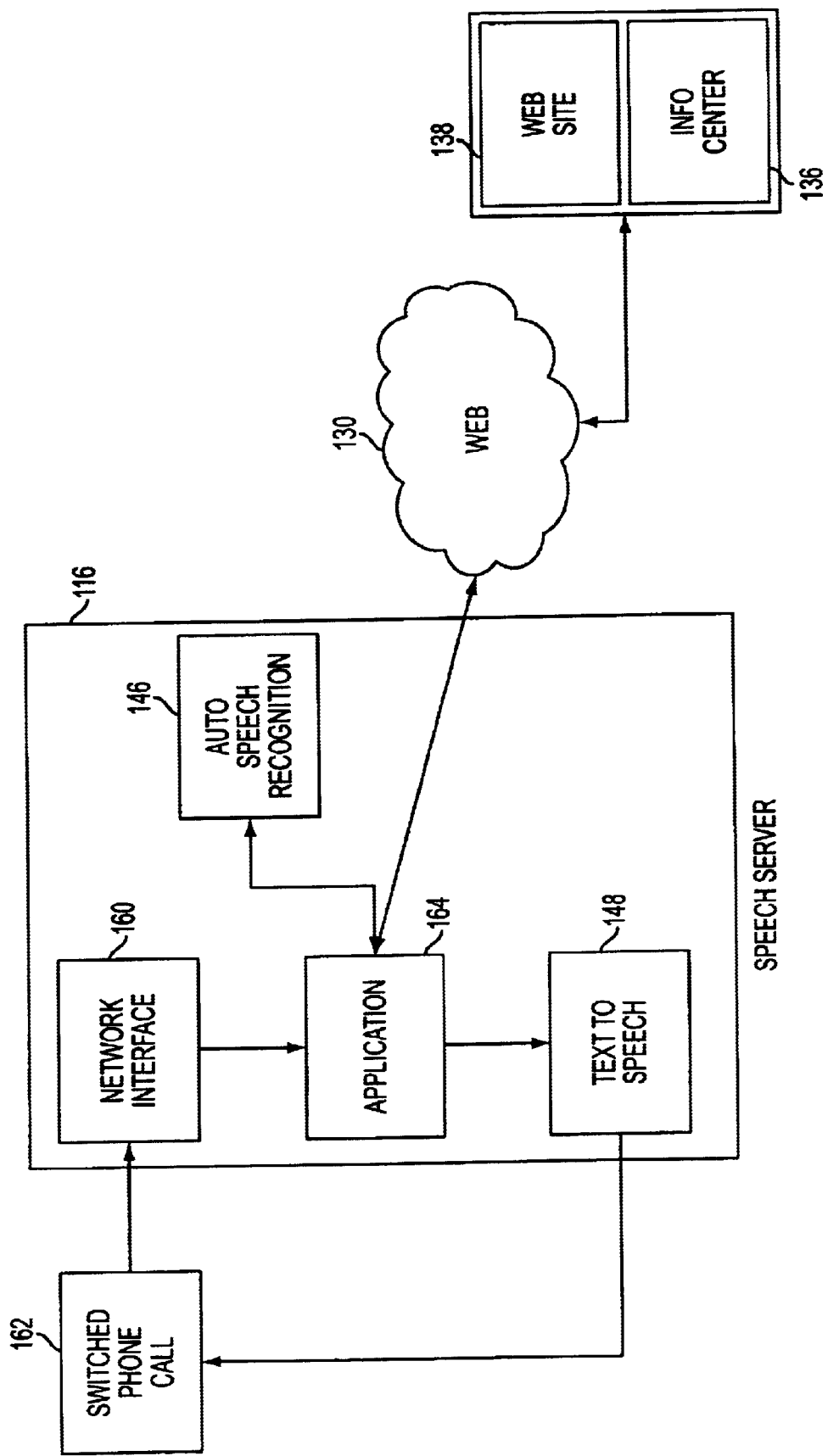
FIG. 2 is a diagrammatic illustration showing an exemplary embodiment of speech server functionality.

FIG. 2 shows an embodiment of Speech Server 116 and its functional connectivity to receive a switched telephone call and to interact with the internet 130. Speech Server 116 performs several tasks such as the task of providing a Network Interface 160 to the analog or digital phone network that provides the switched phone call 162, Automatic Speech Recognition (ASR) 146 or speech-to-text conversion (STT), Text-to-Speech conversion (TTS) 148, runs the application or application program 164 that control and manages the phone calls 162 and the Interactive Voice Response (IVR) 166. IVR refers to the interactive voice response which is conventionally a menu driven response provided in response to an input. A user is asked to say something (for example, "Press or say 1 for marketing, press or say 2 for research", etc.) However, the inventors are not aware of any such conventional systems that provide ASR or text-to-speech in connection with IVR. In one embodiment of the invention, the Speech Server 116 is a personal computer equipped with Dialogic Antares automatic speech recognition boards and other products. Information regarding the Dialogic Antares boards are available from Dialogic Corporation, 1515 Route Ten, Parsippany, N.J. 07054-4596 USA and on their web site at http://www.dialogic.com/products/indx_abp.htm.

Operation of the exemplary Speech Server in the system is now described. The incoming call 162 is answered by a network interface card 160, such as for example a Dialogic network interface card (analog or digital). A prompt is played to the caller 101 over the caller's device 106, 118 asking the caller to say the selected item 170 from the available selections on a voice or audio menu. When the caller responds to the request, the application 164 passes the voice data to the auto speech recognition block 146, such as may be provided by a Dialogic Antares™ board loaded with an Automatic Speech Recognition (ASR) software. ASR software is available from several sources, including for example from Lernout & Hauspie (L&H) (LERNOUT & HAUSPIE Burlington, Mass., Phone: 1-781-203-5000, Fax: 1-781-238-0986, http://www.lhs.com) or SpeechWorks (SpeechWorks International, Inc., 695 Atlantic Avenue, Boston, Mass. 02111, Tel: 617.428.4444, Fax: 617.428.1122, http://www.speechworks.com).

A Dialogic Antares board-based automatic speech recognizer (speech-to-text) 146 translates the voice data into ASCII text (or another code or symbols) that identifies the spoken words and returns a text or other symbolic representation of the results to the application 164. The application 164 accesses, via for example a T-1 line or faster Internet connection, the database 134 of the Information Center 136. Real-time (or near-real-time), active vocabularies are generated at run-time using the database's 134 ASCII text or symbols. The application uses the ASCII text from the database 134, passes it to a second Antares board 148 running a text-to-speech (TTS) algorithm. The TTS algorithm generates the final voice or audio information that is played to the caller 101.

Figure 3:
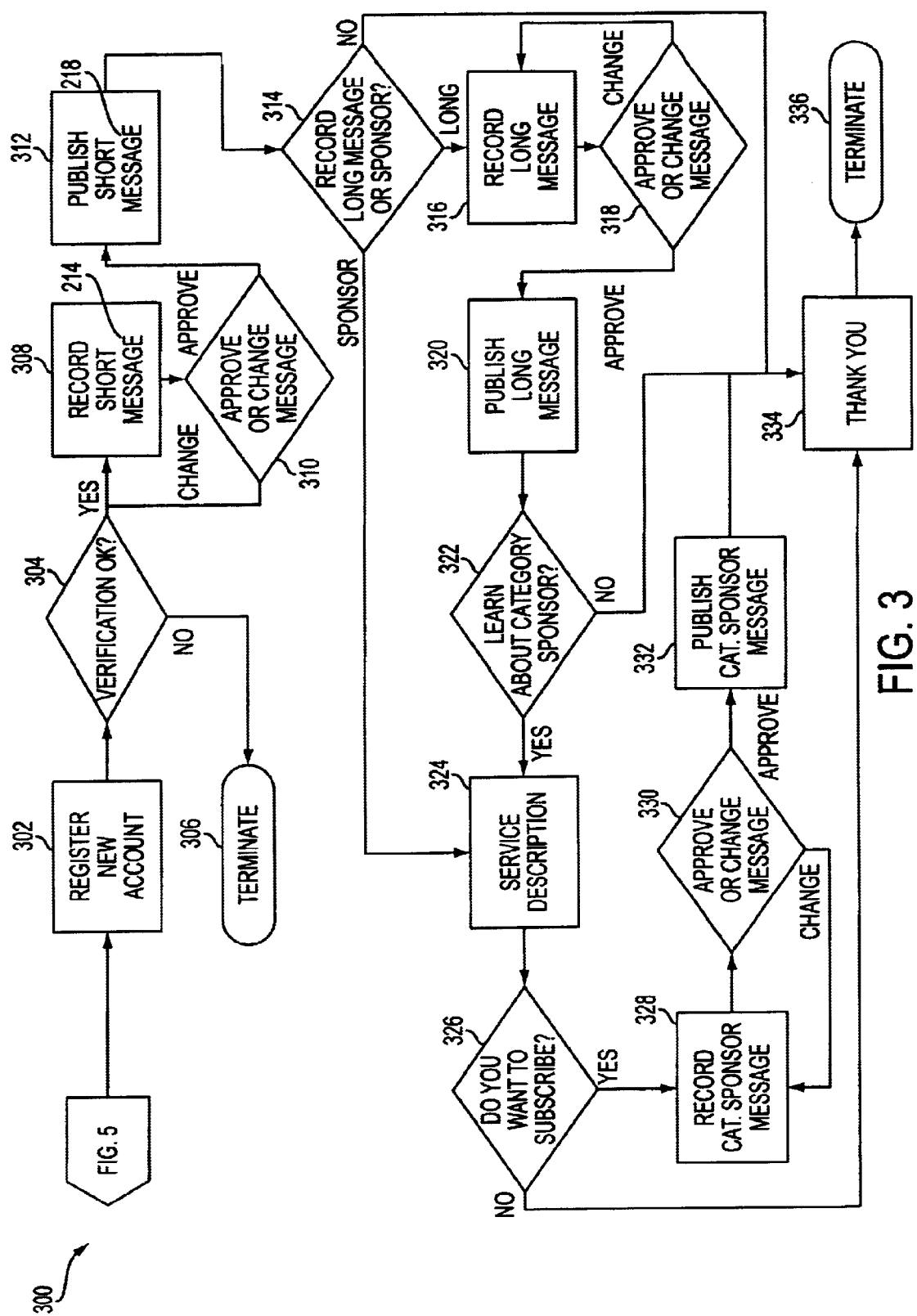
FIG. 3 is a diagrammatic illustration showing an exemplary embodiment of a new business user (merchant) interaction with the inventive system.

FIG. 3 shows an example of the general flow of new business user (new merchant) 201 interaction with the inventive system and method according to one embodiment of the invention. A business user 201 is a user that is providing goods or services to consumers 101 where consumers also refer to the previous caller 101. The business user is desirous of having their goods and services made available to consumers over the inventive system and in promoting their goods and services to consumers.

Once the business user 201 calls, and gets identified as a new business user utilizing a business user registration procedure (see FIG. 5) the business user 201 is asked to say certain business registration information 202, including for example their name 204, name of the business 206, phone number 208, credit card number 210, and/or other pertinent business information 210. Once the registration information 202 is obtained, the system 102 compares the information provided by the new business user 201 with the information that resides in the database 134. The database includes information regarding business so that the authenticity of the attempted registration can be verified with reasonable assurances. In the even that the information does not match, the system 102 may connect to other databases in an attempt to verify the authenticity or otherwise complete the registration. If the information matches, the user registration is completed. If the information does not match, the user is notified with a message providing the new business user with additional options or information, or to recommend trying to say the information again. For example, in one embodiment of the invention, the new business user is prompted with the audio message "Sorry, but the information you have provided does not seem to be correct, say 'again' to start over. You can also hang up and call again, say 'help', or register at our web site www.Talk411.com".

Once the new business user 201 is registered and a password 212 is issued to the business user, then he or she is requested to record a short message 214 that will be heard by the callers 101 who request the business user's phone number 216. Voice recognition can be used (in conjunction with a previously stored authentic voice print of the business user) to authenticate the business user 201 in addition to or instead of the password 212 depending on the quality of the speech recognition technologies used and the quality of the line or other communication ling connecting the business user to the system at the time. So called "caller identification" available in some areas may also assist in verifying the identity of the business user where the business user would then be required to call from a registered telephone number.

Once the business user approves the short message 214 just recorded, the recorded short message is published 216 then he or she is requested to provide an additional longer message 218 that may be or include a special promotion 220, directions to the business location 222, or any other information 224 that will provide additional information to the callers. Both of these short message 214 and long message 218 are available for playback to callers (see FIG. 4) and can also be viewed in text form by those who visit the web site 138 and look up that particular business. The new business user can change either message 214, 218 completely over the phone, or edit it word by word on the PC connected to the web site (see FIG. 4)

In is noted that the messages provided by the business may either be a representation of the business representatives own speech which is preferred so that the quality and character of the voice is maintained, or the message may be computer synthesized speech. The later being necessary if the business chooses to provide or later modify the message using text input on a computer. As maintaining original speech may be somewhat cumbersome, additional fees may be levied on the business for providing actual speech as compared to synthetic speech. Alternatively, the business user may be able to select from a set of available synthesized voice types so that the voice, even though not provided by the business directly, provides the intended feeling or emotion associated with the business. For example, a restaurant may wish to convey the feeling of romance.

Figure 4:
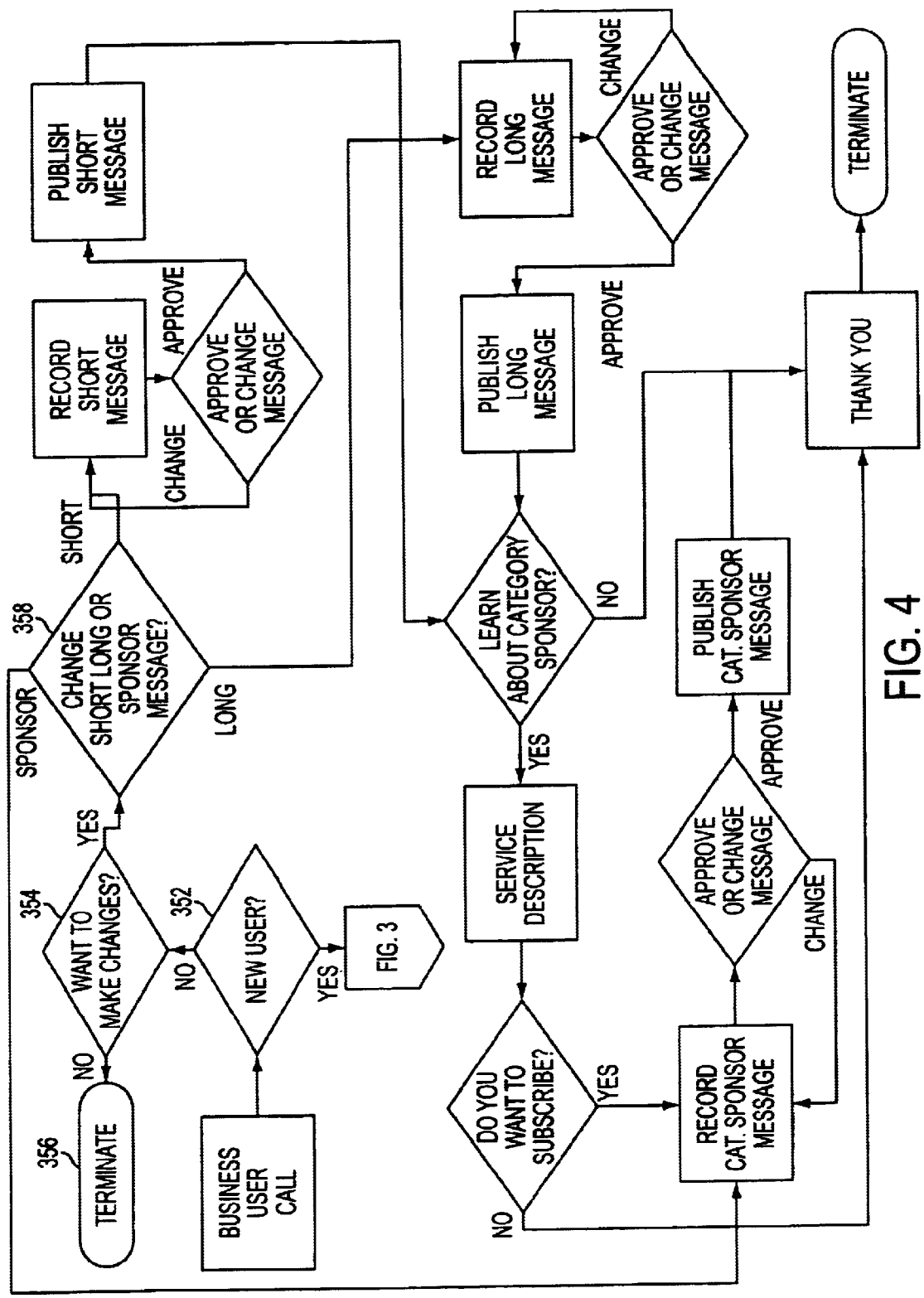
FIG. 4 is a diagrammatic illustration showing an exemplary embodiment of an existing registered business user interaction with the inventive system.

Having described the general operation of the system during a new business interaction, we now describe one particular exemplary embodiment of the new business interaction procedure relative to the flow chart in FIG. 3. Procedure is executed when a determination is made that the business user calling is not a registered business user and a new account needs to be established. As illustrated in FIG. 4, the business user calls the decision is made as to whether the calling business user is a new user or in existing user. Once it is determined that a new account needs to be established, registration of the new business account proceeds as described above wherein the calling business user provides certain business registration information register the new account (Step 302). The registration information provided by the registering new business user must be verified before the new business user interaction can continue. If verification cannot be made, then the interaction is terminated (Step 306), otherwise the business user is prompted to record a short message (Step 308). The business user can then approve the recorded short message 214 or change the recorded short message until the business user is satisfied with the recorded short message an approves it for publication (Step 310) at which time the short message is published in a voice form and in text form on web site 134 (Step 312).

Business user 201 is then prompted to optional record either no message, and long message 218, or sponsor message 219 (Step 314). Event that the business user to record no additional messages, the business user is thanked for providing the information (Step 334) and the interaction terminates (Step 336). If the business user chooses to record a long message than the business user records the long message (Step 316) and a given on opportunity to approve the recorded message or change that message until the business user is satisfied with the recorded long message (Step 318). The long message is published (Step 320) and the business user is again the given opportunity to learn about category sponsorship (Step 322). If the business user declines the opportunity to learn about category sponsorship, the business user is thanked for providing the information (Step 334) and the interaction terminates (Step 336). On the other hand, if the business user indicates a desire to learn about category sponsorship he or she is provided with the description of the sponsorship service (Step 324) and again asked if he or she wishes to subscribe to the category sponsorship service (Step 326). A category sponsorship message is a message will come up when the caller requests businesses in a category without a specific business name in mind. Then the system will play back the message of the sponsors in that category in a pre-determined order, random order or a dynamically defined order (see explanation relative to the general user interaction of FIG. 5). If the business user declines the opportunity to subscribe, the business user is thanked for providing the information (Step 334) and the interaction terminates (Step 336). If the business user indicates a desire to subscribe, he or she is given opportunity to record a category sponsorship message (Step 328) and further opportunities to either approve or change the message until he or she is satisfied with the recorded category sponsor message (Step 330). The category sponsor message is then published (Step 332) and the business user is thanked for providing the information (Step 334) and the interaction terminates (Step 336).

As illustrated in the flow chart diagram of FIG. 4, the procedures associated with the repeat business user interaction are substantially the same as, though not identical to, those just described for a new business user interaction. The differences primarily concerned how the initial phase of the business user call to the system is handled. For in existing registered business user interaction, the system receives the business user call and determines if it is a new user or an existing registered user (Step 352). If the system determines that it is a new business user, than the procedure already described relative to FIG. 3 is executed. However, if the system determines that an existing registered business user is calling into the system, it presumed step the existing business user wishes to make changes to one or more of the items of registration information or to one or more of the recorded messages (Step 354). If the business user decides after placing the call that he or she does not wish to make changes than the interaction terminates (Step 356), otherwise the business user is asked whether he or she wishes to change the s tune hort message, the long message, or the sponsor message (Step 358) and given opportunity to change one or more of these messages. These messages are the Long, Short and Sponsor messages that he may have already input into the system via a phone or a personal computer of other information appliance. The process for recording, changing, approving, and publishing each of these messages is the same as already described relative to FIG. 3, and the business user it is similar given additional opportunities to learn about, subscribe to, and record messages pertinent to additional services provided by the system.

In order to make the user interface more satisfactory, additional steps can be introduced or some of the shown steps can be deleted from the interaction flow. For example, after the Business User makes changes to the short message, he can be prompted to see whether he wants to make any changes to the long or the sponsor messages. An example of the deletion of a step can be where the user is initially prompted to find out whether he wants to make changes and gets told that he can say anytime "make changes" and trigger the menu options. The amount of consolidation largely depends on the speech recognition technologies employed and the key words chosen for the speech recognition vocabulary.

In addition, other embodiments of the invention may largely or entirely eliminae the particular command and data extraction procedure set forth in the above described procedures and replace them in all or in part by a natural language recognition and extraction procedure that either listens to the user's request in free form speech and extracts commands and/or data from the user's speech, or extracts the commands and/or data in part and intelligently asks additional questions of the user for any added information. In this sense, the inventive system and method provide logic for conducting a dialog or conversation with the caller. Essentially the same or substantially the same information is exchanged between the user and the system but with a more flexible interface that is more familiar and enjoyable to the user.

Those workers having ordinary skill in the art in light of the description provided here will appreciate that the procedures described for existing registered users as well as for new business users may be modified to provide somewhat different options at each stage all the interaction or to provide different ordering of the options. Therefore, the interaction described here are merely exemplary of the type of business user to system interaction desirable in an implemented system, but does not limit the inventive system or method to these particular interaction schemes or procedures.

Figure 5:
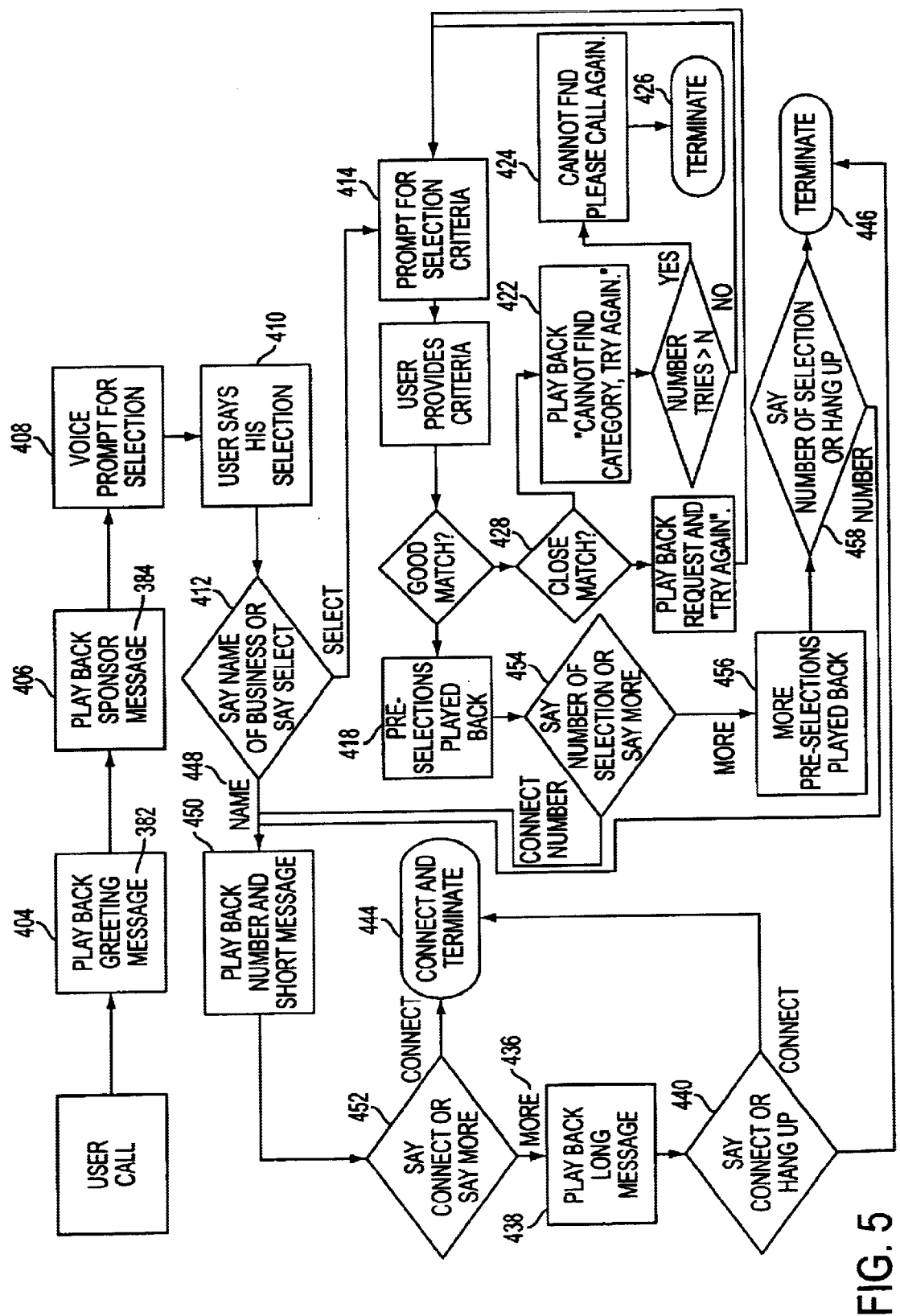
FIG. 5 is a diagrammatic illustration showing an embodiment of a general consumer user interaction with the inventive system.

FIG. 5 shows an exemplary embodiment of the General User interaction 402. Once the consumer user 101 calls, a greeting message 382 is played back (Step 404) such as "This is TALK411, your best source for local information" followed by a sponsor message 384, such as for example "brought to you by Dialsurf, bringing the web to your phone" (Step 406). This sponsor message is typically a paid message by a sponsor. Then the voice menu 386 is played back to the caller (Step 408), such as "Please say your selection: Restaurants, Lawyers, Auto dealers, etc.". Once the consumer user says one of the menu items (Step 410), then he or she is prompted with a request message (Step 412), such as "Say the name of the business or say 'select'".

If the consumer user 101 says "select" or another word that indicates to the system that he or she (the consumer user) should be prompted with a list of pre-selected business names, he or she is prompted with a request to specify selection criteria (Step 414). This criteria 388 is predetermined and varies according to the type of business. In the case of restaurants for example, it may be "type of cuisine, city and zip code". In case of lawyers, it may be for example "type of practice, city and zip code". Once the user says the criteria 388, then the system 102 tries to match the requested category or criteria 388 to the closest category or criteria stored in the database 134. If the match is good (according to some predefined rules or decision algorithm or procedure), then the system will play back a number of business names pre-determined by the system (Step 418). These names can be picked from the database 134, in the requested category, in a pre-determined fashion, randomly or based on a dynamically changing criteria or some fixed set of rules.

The inventive system, method, and business model or operating method is applicable to a broad variety of business and merchant types including but not limited in any way to: restaurants, physicians and surgeons, auto parts, auto repair and service, pizza, auto dealers, department stores, attorneys/lawyers, dentists, hospitals, insurance, beauty salons, banks, plumbing contractors, florists, as well as many other types of businesses and services.

One example of pre-determined way is for the subscribed businesses to pay the corresponding fees to be included in the top category (Category #1), second category (Category #2), and the like for a specific time period. An example of random procedure can be, as the name implies, based on a random number generator that picks a database record in the category requested. An example of dynamically changing criteria is when users rate the businesses on a real time or periodic basis and which ever business is rated highest gets to be heard as the #1 (first named), #2 (next named), #3 (third named), and the like down hierarchical list.

After the pre-selections are played back, the caller is invited to say the 'number of the menu selection' or to say 'more" (Step 454), if the caller responds with the number of the selection, the number and a short message is played back (Step 450) and he or she gets prompted with a questions such as "Say connect or 'more' for additional information" (Step 452). If the caller says "connect", the caller is connected to the phone number that was found (Step 444). If the caller says "more" (Step 436) then the pre-recorded Long Message is played back (Step 438) with a question such as "Say connect or just hang up your phone" (Step 440). Based on the caller's selection, either the caller gets connected to the phone number (Step 444), or gets disconnected to the service (Step 446). Of course, different rules may be applied to permit the user to input different choices, however, in some situations it is desirable to have a user call in again when they have rethought their need rather than to tie up the connection for an extended period of time.

If the caller responds by saying 'more', then additional pre-selections are played back to give the caller more and different choices (Step 456). The caller may then either say the number of one of the new selections (Step 458) or terminate (Step 446). In some instances, the caller may be permitted to keep repeating the request for more choices until all choices available in the data base (or a predetermined number of such choices) have been presented to the caller. In either event, if the caller does not like or select one of the available choices, the call terminates (Step 446).

If there is no match (Step 420), an answer such as "sorry, but we cannot find this category in our list, try again" is played back (Step 422). After a predetermined number of tries (for example, after two tries) if there is no match, the system will say something like "sorry, we could not find a business that matches your request, please call us again" (Step 424) and terminate the call (Step 426). If there is a close match, the system will play back the match to verify the request for further action (Step 428).

Once the caller chooses the business by saying its name or menu number (Step 430), the number and a short message is played back (Step 450) and he or she gets prompted with a questions such as "Say connect or 'more' for additional information" (Step 452). If the caller says "connect", the caller is connected to the phone number that was found (Step 444). If the caller says "more" (Step 436) then the pre-recorded Long Message is played back (Step 438) with a question such as "Say connect or just hang up your phone" (Step 440). Based on the caller's selection, either the caller gets connected to the phone number (Step 444), or gets disconnected to the service (Step 446).

If the caller says the name of a particular business instead (Step 448), then the phone number and the Short Message (refer to FIG. 3) will be played back (Step 450) with an additional prompt (Step 452), such as "Say 'connect' or 'more' for additional business information (the Long Message per FIG. 3). Once the Long Message is played back (Step 438), the user will be prompted once more whether the connect or terminate the call (Step 440).

Figure 6:
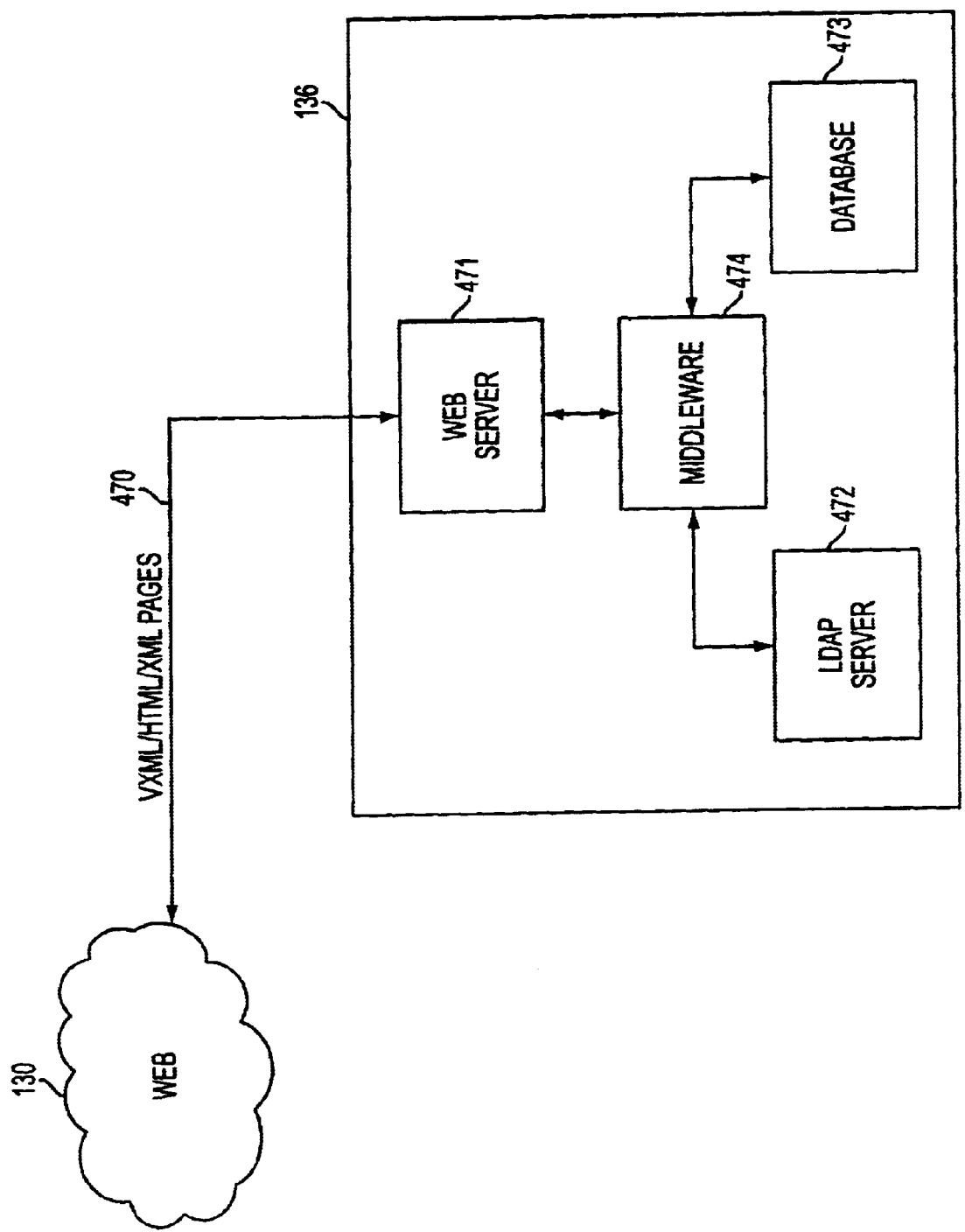
FIG. 6 is a diagrammatic illustration showing an exemplary implementation of the inventive directory service on the Web

FIG. 6 shows the implementation of the Directory Service of the info center 136 on the Web 130, where the Web Server 471 serves VXML or HTML/XML pages 470, the LDAP Server (Lightweight Directory Access Protocol Server) 472 runs over TCP/IP and provides quick response to high volume lookup to the Database 473. The Middleware 474 is the layer of software that integrates operations of the Web Server, LDAP Server, and the Database (or any additional software such as Transaction Server). LDAP Servers and operation are known in the art, and is described, for example as of Mar. 23, 2000, at http://www.umich.edu/~dirsvcv/ldap/doc/guides/slapd/1.html.

An example of a Web Server for high volume application such as TALK411 is the Microsoft Internet Information Server (IIS). Microsoft IIS runs on Windows NT Server. LDAP also runs on Windows NT® 4.0 using Service Pack 4 or later, Windows® 2000, or Windows 95/98. All systems desirably have TCP/IP (or an equivalent capability) installed. Additional information relative to Microsoft products, including Microsoft IIS is available on their web-site as of Mar. 23, 2000 at http://msdn.microsoft.com/isapi/msdnlib.idc?theURL=/library/psdk/ldap/ld_about_7euh.htm p Other optional but desirable features may also be provided. For example, one desirable promotional feature involves issuing an audio coupon to a consumer user of the inventive system. In one embodiment, a consumer user is issued an audio coupon entitling the user to a promotion. Typically, such promotion would entitle the user to a discount to be applied to the item or service purchased when the consumer user connects using the inventive system and method. This discount, for example 10 percent off, would only be available to the consumer user when using the inventive TALK411 system and is therefore an enticement for a consumer user to use the inventive system rather than dealing with the business through conventional means. Other promotions might involve a buy one get one free offer, of free drink with order of food type offer, or any other the other variety of promotional offers typically made in the retail trade between merchants and consumers.

The audio coupon may be provided in a variety of ways. For example, the business would become aware that the consumer user contacted the business using the inventive TALK411 system and automatically give the consumer user a discount (or other promotional item) when the your was placed. Alternatively, the consumer user might be given a coupon code which could only be available to a consumer user who ate utilize the inventive system, and a consumer user would provide this code to the merchant upon connection. This code might be generic to the business or particularized to that specific transaction. Therefore, in addition to be self promotion aspects of the business model, the optional use of audio coupons also provides considerable business advantages. In one embodiment of the invention, the system inserts a message to the merchant after the call has been connected to identify the caller as a valid service user and to validate the audio coupon.

In a preferred embodiment, the use of audio coupons is integrated with the world wide web or internet in that the audio coupons may be identified, stored to, retrieved from, or otherwise processed using the businesses or the inventive services web site. In this way, the consumer user is not limited to using the coupon at the time it was earned, but may instead be collected for later redemption. This also affords an opportunity to obtain a printed copy of the coupon for use at any later time.

In yet another embodiment, the audio coupon or a coupon derived from that coupon may be delivered to a personal data assistant (such as for example, an email enabled PALM VII) so that the PDA stores the coupon and serves as a medium for displaying the coupon the business, merchant, or organization.

Independent of how the coupon is delivered, one aspect of the inventive system, method, and business model is to collect money or other revenue in what ever form for each coupon delivered. It is also advantageous to collect money or other revenue for each coupon redeemed either as a fixed amount per coupon or as a portion (such as a percentage) of the sale, or both. Collection of revenue for each coupon delivered is separate from collection of revenue for each redemption or sale.

In a further embodiment, the system has geographical context provided by a known location of the caller. For example, it is expected that mobile or cellular telephones will have capability to self locate, either using internal satellite-based Geographical Positioning System (GPS) means or by using various schemes known in the art for determining (or estimating) the location of a cellular telephone based on proximity to cellular base stations, hand-off's to base stations, and similar techniques. In any event, the inventive system provides for geographically-based recommendations, geographically-based promotions, as well as for geographically based audio coupon delivery. Here the geographic proximity may be established according to some set of rules which may for example depend upon the density of business establishments in the local area. However, in one embodiment the geographically directed audio coupons pertain to business within one to a few blocks of the callers location, in other embodiments to a mile or two, and in still other embodiments to the region of the city or town.

In yet another optional feature, consumer user's who call into the inventive service will be able to rate the particular business after they have utilized the businesses goods or services. For example, a consumer user having been referred to a restaurant using inventive system can later call in using a toll-free or free local phone number and provide feedback, such as in the form of a rating, relative to their experience.

These ratings would then be compiled and made available to the local businesses. Hopefully such feedback would encourage the businesses to either maintain their high quality of service or to improve the quality of their service and/or goods in response to the consumer user's rating. In another embodiment, these ratings were also serve as an additional information source for consumer user's and would be available either or telephone or on Internet based website. The business establishment having demonstrated a particularly high-level of goods or service based on these ratings would be placed into a category of highly rated businesses, such as "BayHits", would be available to the consumer user during his or her call into the system. So for example, when the user calls in to request "Italian restaurant in Palo Alto", if in one of the candidate restaurant played back to the caller happens to be a "BayHit" then that restaurant would be indemnified as such. For example, the caller might receive a message "Il Fornaio—a BayHit". Alternatively, consumer user may be able to request "BayHit Restaurants" and receive only a list of restaurants satisfying the BayHit criteria. In some embodiment of the invention, the rating or BayHit feature may be provided free to the businesses while in an alternative preferred embodiment businesses falling within the highly rated or "BayHit" category would be charged the nominal fee. Those workers having ordinary skill in the art in light of description provided here will appreciate that this rating and promotion scheme may be implement in a variety of ways and that the particular descriptions provided here are merely exemplary of the more general method. The ratings may alternatively or additionally be provided on an Internet website (such as http://www.bayhits.com so that information obtained from caller's using inventive system method would be available to other individuals and businesses as well.

Some of the steps in this procedure can be changed, left out, or combined to make the user interaction to be a satisfying experience as will readily be understood by workers having ordinary skill in the art in light of the description provided here.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. All publications and patent applications cited in this specification are herein incorporated by reference as if each individual publication or patent application were specifically and individually indicated to be incorporated by reference.

I claim:

1. An operating model for a telephone-based audio-interfaced goods and services information service, comprising:

an information database provider storing merchant information including a merchant identity information and at least one good or service associated with said merchant;

an audio merchant interface including a first telephone for inputting said merchant information into said database;

a second telephone for inputting end-consumer spoken voice commands making a request for information and for receiving said merchant information in audio form stored in said database in response to said input spoken voice commands making said request for information, said inputting end-consumer spoken voice commands making a request for information occurring without a conversion of a text command into a spoken voice command and without the use of a computer; and at least one speech server separate from said merchant interface and said end-consumer second telephone and operable to: (i) receive said input spoken end-consumer voice commands in audio form and translate said received input spoken voice commands into a first symbolic command form using a speech-to-text conversion engine so that said symbolic command form may be used to search said information database and retrieve an information item in a second symbolic form therefrom, and (ii) convert said retrieved second symbolic form information item into speech using a text-to-speech conversion engine for communication to said end user in spoken form;

said second telephone comprises a mobile telephone; and further comprising:

receiving and collecting raw business rating inputs in the form of voice utterances from users, processing these speech uttered ratings inputs to generate compiled business ratings, and providing said processed business ratings to users in response to said speech utterances;

providing a referral service accessible via said second telephone and operable to provide a consumer with a referral to a merchant having a predetermined rating, including providing a highly rated business;

providing a merchant self-promotion and consumer feedback features that encourage use, generate revenues, and provide incentives for use by both merchants and consumers;

said merchant information includes a merchant identifier, a merchant coupon, a category sponsorship message, a merchant telephone number, and a stored merchant information as a recorded audio information;

said consumer interface does not utilize a visual display even if present in said consumer interface to interact with said speech server; and determining the geographic location of the caller, and providing an information having geographical context to the caller based on said determined geographic caller location, said information having geographical context being selected from the set consisting of: a geographically based recommendations, a geographically-based promotion, a geographically based audio coupon delivery, and combinations thereof.

2. A method comprising:

receiving a speech utterance in the form of an electronic audio signal directly from an end user consumer from a telephone, the speech utterance including spoken voice input commands requesting information on a merchant good or service from the end user consumer without requiring the end user consumer to provide any text or symbolic command representation for the request;

converting the speech utterance to text and extracting commands and optional data from said converted text;

searching a database storing a plurality of data items including a merchant data items and at least one good or service data item associated with said merchant for a particular one of said plurality of said data items in response to said converted text-based command and data;

generating a speech-based audio representation of said particular data item identified in said database search for playback over a telephone; serving said speech-based representation of said particular data item to said telephone;

receiving and collecting raw business rating inputs in the form of voice utterances from users, processing these speech uttered ratings inputs to generate compiled business ratings, and providing said processed business ratings to users in response to said speech utterances;

providing a referral service accessible via said second telephone and operable to provide a consumer with a referral to a merchant having a predetermined rating, including providing a highly rated businesses;

providing a merchant self-promotion and consumer feedback features that encourage use, generate revenues, and provide incentives for use by both merchants and consumers;

said merchant information includes a merchant identifier, a merchant coupon, a category sponsorship message, a merchant telephone number, and a stored merchant information as a recorded audio information;

said consumer interface does not utilize a visual display even if present in said consumer interface to interact with said speech server; and determining the geographic location of the caller, and providing an information having geographical context to the caller based on said determined geographic caller location, said information having geographical context being selected from the set consisting of: a geographically based recommendations, a geographically-based promotion, a geographically based audio coupon delivery, and combinations thereof.

3. A system comprising:

a speech-to-text conversion engine converting speech-based audio input commands and data received from an external telephone separate from said speech-to-text conversion engine over a wired or wireless telephone line into output text-based commands and data;

a database storing a plurality of data items including a merchant identity information and at least one good or service associated with said merchant;

a database search engine searching the database for a particular data item in response to said output text-based command and data;

a text-to-speech conversion engine generating a speech-based audio representation of said text-based particular data item identified in said database search;

a server separate from said telephone for communicating said speech-based audio representation of said particular data item to said telephone; and means for receiving and collecting raw business rating inputs in the form of voice utterances from users, processing these speech uttered ratings inputs to generate compiled business ratings, and providing said processed business ratings to users in response to said speech utterances;

means for providing a referral service accessible via said second telephone and operable to provide a consumer with a referral to a merchant having a predetermined rating, including providing a highly rated businesses;

means for providing a merchant self-promotion and consumer feedback features that encourage use, generate revenues, and provide incentives for use by both merchants and consumers;

said merchant information includes a merchant identifier, a merchant coupon, a category sponsorship message, a merchant telephone number, and a stored merchant information as a recorded audio information;

said consumer interface does not utilize a visual display even if present in said consumer interface to interact with said speech server; and means for determining the geographic location of the caller, and providing an information having geographical context to the caller based on said determined geographic caller location, said information having geographical context being selected from the set consisting of: a geographically based recommendations, a geographically-based promotion, a geographically based audio coupon delivery, and combinations thereof.

4. A business model for a business in which consumers call into a service using an ordinary telephone and make requests in plain speech for information and positive referrals on goods and/or services, merchants access the service to create and edit merchant information in real-time, and the service provides responses to the request in plain speech in real-time over the same telephone, the service using an automated speech driven query and response to reduce cost of operation as compared to non-automated speech driven query and response services and further comprising:

receiving and collecting raw business rating inputs in the form of voice utterances from users, processing these speech uttered ratings inputs to generate compiled business ratings, and providing said processed business ratings to users in response to said speech utterances;

providing a referral service accessible via said second telephone and operable to provide a consumer with a referral to a merchant having a predetermined rating, including providing a highly rated businesses;

providing a merchant self-promotion and consumer feedback features that encourage use, generate revenues, and provide incentives for use by both merchants and consumers;

said merchant information includes a merchant identifier, a merchant coupon, a category sponsorship message, a merchant telephone number, and a stored merchant information as a recorded audio information;

said consumer interface does not utilize a visual display even if present in said consumer interface to interact with said speech server; and determining the geographic location of the caller, and providing an information having geographical context to the caller based on said determined geographic caller location, said information having geographical context being selected from the set consisting of: a geographically based recommendations, a geographically-based promotion, a geographically based audio coupon delivery, and combinations thereof.

5. A method comprising:

receiving a speech utterance in the form of an electronic audio signal directly from an end user consumer from a telephone, the speech utterance including spoken voice input commands requesting information on a merchant good or service from the end user consumer without requiring the end user consumer to provide any text or symbolic command representation for the request;

converting the speech utterance to text and extracting commands and optional data from said converted text;

searching a database storing a plurality of data items including a merchant data items and at least one good or service data item associated with said merchant for a particular one of said plurality of said data items in response to said converted text-based command and data;.

generating a speech-based audio representation of said particular data item identified in said database search for playback over a telephone;

serving said speech-based representation of said particular data item to said telephone;

receiving and collecting raw business rating inputs in the form of voice utterances from users, processing these speech uttered ratings inputs to generate compiled business ratings, and providing said processed business ratings to users in response to said speech utterances;

providing a referral service accessible via said second telephone and operable to provide a consumer with a referral to a merchant having a predetermined rating, including providing a highly rated businesses;

providing a merchant self-promotion and consumer feedback features that encourage use, generate revenues, and provide incentives for use by both merchants and consumers;

said merchant information includes a merchant identifier, a merchant coupon, a category sponsorship message, a merchant telephone number, and a stored merchant information as a recorded audio information;

said consumer interface does not utilize a visual display even if present in said consumer interface to interact with said speech server; and determining the geographic location of the caller, and providing an information having geographical context to the caller based on said determined geographic caller location, said information having geographical context being selected from the set consisting of: a geographically based recommendations, a geographically-based promotion, a geographically based audio coupon delivery, and combinations thereof.

6. A method comprising:

receiving a speech utterance in the form of an electronic audio signal directly from an end user consumer from a telephone, the speech utterance including spoken voice input commands requesting information on a merchant good or service from the end user consumer without requiring the end user consumer to provide any text or symbolic command representation for the request;

converting the speech utterance to text and extracting commands and optional data from said converted text;

searching a database storing a plurality of data items including a merchant data item and at least one good or service data item associated.with said merchant for a particular one of said plurality of said data items in response to said converted text-based command and data;

generating a speech-based audio representation of said particular data item identified in said database search for playback over a telephone;

serving said speech-based representation of said particular data item to said telephone;

said information having geographical context is selected from the set consisting of: a geographically based recommendation, a geographically-based promotion, a geographically based audio coupon delivery, and combinations thereof.

7. An operating model for a telephone-based audio-interfaced goods and services information service, comprising:

an information database provider storing merchant information including a merchant identity information and at least one good or service associated with said merchant;

an audio merchant interface including a first telephone for inputting said merchant information into said database;

a second telephone for inputting end-consumer spoken voice commands making a request for information and for receiving said merchant information in audio form stored in said database in response to said input spoken voice commands making said request for information, said inputting end-consumer spoken voice commands making a request for information occurring without a conversion of a text command into a spoken voice command and without the use of a computer;

at least one speech server separate from said merchant interface and said end-consumer second telephone and operable to: (i) receive said input spoken end-consumer voice commands in audio form and translate said received input spoken voice commands into a first symbolic command form using a speech-to-text conversion engine so that said symbolic command form may be used to search said information database and retrieve an information item in a second symbolic form therefrom, and (ii) convert said retrieved second symbolic form information item into speech using a text-to-speech conversion engine for communication to said end user in spoken form; and determining a geographic information for the end user, and providing the merchant information having geographical context to the end user based on said determined geographic caller location, said information having geographical context being selected from the set consisting of: a geographically based recommendations, a geographically-based promotion, a geographically based audio coupon delivery, and combinations thereof.

8. The operating method in claim 7, wherein:
said second telephone comprises a cellular wireless telephone.

9. The operating model in claim 8, wherein said consumer also inputs non-voice commands and data from a keypad on said telephone handset in addition to said spoken voice commands in association with said request for information.

10. The operating model in claim 9, wherein said merchant information includes a merchant identifier.

11. The operating model in claim 9, wherein said merchant information includes a merchant audio coupon or discount offering.

12. The operating model in claim 9, wherein said merchant information includes category sponsorship message.

13. The operating model in claim 9, wherein said merchant information includes a merchant registration information including a merchant name, and a merchant telephone number.

14. The operating model in claim 9, wherein said merchant information includes a merchant credit number.

15. The operating model of claim 9, wherein the geographic context is determined using caller identification.

16. The operating model of claim 9, wherein the geographic context is determined by a known location of the caller.

17. The operating model of claim 16, wherein the known location is based on an ability of the telephone to self-locate.

18. The operating model of claim 17, wherein the ability to self locate includes geographic location derived from a geographic positioning system (GPS).

19. The operating model of claim 17, wherein the ability to self-locate includes cellular base station proximity or base-station to base-station handoffs.

20. The operating model of claim 9, wherein the geographical context is determined by a spoken request of a location of interest.

21. The operating model of claim 9, wherein the spoken request includes a spoken response to a prompt for a selection criteria.

22. The operating model of claim 21, the spoken response includes a city name.

23. The operating model of claim 21, wherein the spoken response includes a zip code.

24. The operating model of claim 21, wherein the spoken response includes a location in a particular area of a city.

25. The operating method in claim 9, further providing a merchant self-promotion and consumer feedback features that encourage use, generate revenues, and provide incentives for use by both merchants and consumers.

26. A system comprising:

a speech server receiving a spoken voice telephone call from an external telephone including spoken voice input commands requesting information on a good or service from an end consumer without requiring said end consumer to provide any text or symbolic command representation;

a speech-to-text conversion engine converting said received spoken voice input commands from said external telephone separate from said speech-to-text conversion engine over a wired or wireless telephone line to generate output text-based or symbol-based commands and data;

means for determining a geographic location of interest of an end consumer making said spoken telephone call;

a database storing a plurality of data items including a merchant identity information and at least one good or service associated with said merchant;

a database search engine searching the database for a particular data item in response to said generated output text-based command and data, said generated output-text-based commands and data being used to query said database to service said request for information by retrieving said particular data item;

said particular data item having geographical context to the end consumer based on said determined geographic end user location, said information having geographical context being selected from the set consisting of: a geographically based recommendation, a geographically-based promotion, a geographically based audio coupon delivery, and combinations thereof;

a text-to-speech conversion engine generating a speech-based audio representation of said retrieved text-based particular data item identified in said database search; and a server separate from said end-consumer telephone for providing and communicating said speech-based audio representation of said particular data item to said end-consumer external telephone.

27. The system in claim 26, wherein said speech-to-text conversion engine and said text-to-speech conversion engine communicate directly with callers over said telephone, wherein said callers comprise a consumer and a merchant.

28. The system in claim 26, wherein said external telephone comprises a rotary dial telephone not having a computer processor or visual display.

29. The system in claim 26, further comprising a device selected from the group consisting of a personal computer, notebook computer, personal data assistant (PDA), information appliance, or combination thereof.

30. The system of claim 26, wherein the means for determining geographic location of interest of an end consumer includes means for geographical context determination based on at least one of a caller identification, a known location of the end user, an ability of the telephone to self-locate, an ability to self locate including geographic location derived from a geographic positioning system (GPS), an ability to self-locate based on cellular base station proximity or base-station to base-station handoffs, a spoken request of a location of interest, a spoken response to a prompt for a selection criteria, a spoken response including a spoken a city name, a spoken response including a spoken zip code, a spoken response including a location in a particular area of a city.

31. The system of claim 26, wherein the means for determining geographic interest of an end consumer includes means for geographical context determination based on at least one of a caller identification, a known location of the end user, an ability of the telephone to self-locate, an ability to self locate including geographic location derived from a geographic positioning system (GPS), an ability to self-locate based on cellular base station proximity or base-station to base-station handoffs, a spoken request of a location of interest, a spoken response to a prompt for a selection criteria, a spoken response including a spoken a city name, a spoken response including a spoken zip code, a spoken response including a location in a particular area of a city.

32. A system as in claim 26, wherein the geographically based recommendation comprises a geographically based recommendation of a business name and a business telephone number.

33. A system as in claim 26, wherein the geographically based recommendation comprises a geographically based recommendation of a business name and related business information selected from the set of related business information consisting of a business location, a business telephone number, a business type, a special incentive offered by the business, an information that distinguishes from other businesses, and combinations thereof.

34. A system as in claim 26, wherein the recommendation further includes a first short message that will be heard by a caller who request the recommendation.

35. A system as in claim 26, wherein the recommendation further includes a special promotion.

36. A system as in claim 26, wherein the recommendation further includes directions to a business location.

37. A system as in claim 26, wherein the recommendation is a recommendation to a restaurant having a requested type of cuisine.

38. A system as in claim 26, wherein the recommendation comprises a recommendation to a business or merchant selected from the set of businesses and merchants consisting of: a restaurant, a physician or surgeon, an auto parts business, an auto repair and service business, a pizza business or restaurant, an auto dealer, a department store, an attorney or lawyer, a dentist, a hospital, an insurance business, a beauty salon, a bank, a plumbing contractor, a florist, as well as many other types of businesses and services.

39. A system comprising:
  a speech-to-text conversion engine converting speech-based audio input commands and data received from an external telephone separate from said speech-to-text conversion engine over a wired or wireless telephone line into output text-based commands and data;
  a database storing a plurality of data items including a merchant identity information and at least one good or service associated with said merchant;
  a database search engine searching the database for a particular data item in response to said output text-based command and data;
  a text-to-speech conversion engine generating a speech-based audio representation of said text-based particular data item identified in said database search;
  a server separate from said telephone for communicating said speech-based audio representation of said particular data item to said telephone;
  means for communicating and validating a promotional audio coupon, said means for validating including means for inserting a spoken message to the merchant after the call has been connected to identify the caller as a valid service user and to validate the audio coupon; and
  means for determining a geographic location of interest associated with a request communicated in said speech-based audio input commands and data and for providing said particular data item having geographical context to the request based on said geographic location, said particular data item having geographical context selected from the set consisting of: a geographically based recommendation, a geographically-based promotion, a geographically based audio coupon delivery, and combinations thereof.

40. The system in claim 39, wherein said validating includes the system inserting a message to the merchant after the call has been connected to identify the caller as a valid service user and to validate the audio coupon.

41. A system comprising:
  a speech-to-text conversion engine converting speech-based audio input commands and data received from an external telephone separate from said speech-to-text conversion engine over a wired or wireless telephone line into output text-based commands and data;
  a database storing a plurality of data items including a merchant identity information and at least one good or service associated with said merchant;
  a database search engine searching the database for a particular data item in response to said output text-based command and data;
  a text-to-speech conversion engine generating a speech-based audio representation of said text-based particular data item identified in said database search;
  a server separate from said telephone for communicating said speech-based audio representation of said particular data item to said telephone;
  means for receiving rating inputs from users and for providing audio processed ratings based on said ratings inputs to consumers; and
  means for determining a geographic location of interest associated with a request communicated in said speech-based audio input commands and data and for providing said particular data item having geographical context to the request based on said geographic location of interest, said particular data item having geographical context selected from the set consisting of: a geographically based recommendation, a geographically-based promotion, a geographically based audio coupon delivery, and combinations thereof.

42. The system of claim 41, wherein the means for determining geographic location of interest associated with said request includes means for geographical context determination based on at least one of a telephone caller identification, a known location of the end user of the telephone, an ability of the telephone to self-locate, an ability of the telephone to self locate including geographic location derived from a geographic positioning system (GPS), an ability of the telephone to self-locate based on cellular base station proximity or base-station to base-station handoffs, a spoken request of a location of interest, a spoken response to a prompt for a selection criteria, a spoken response including a spoken a city name, a spoken response including a spoken zip code, a spoken response including a location in a particular area of a city.

43. A method comprising:
receiving a speech utterance in the form of an electronic audio signal directly from an end user consumer from a telephone, the speech utterance including spoken voice input commands requesting an information on a merchant good or service from the end user consumer without requiring the end user consumer to provide any text or symbolic command representation for the request;
converting the speech utterance to text and extracting commands and optional data from said converted text;
determining a geographic location of interest of said end user consumer;
searching a database storing a plurality of data items including a merchant data item and at least one good or service data item associated with said merchant for a particular one of said plurality of said data items in response to said converted text-based command and data, said searching including searching for a particular data item having geographical context to the end user consumer based on said determined geographic end user consumer location of interest, said data item having geographical context being selected from the set consisting of: a geographically based recommendations, a geographically-based promotion, a geographically based audio coupon delivery, and combinations thereof;
generating a speech-based audio representation of said particular data item identified in said database search for playback over said telephone; and
serving said speech-based representation of said particular data item to said telephone.

44. The method in claim 43, wherein said telephone is a wireless telephone.

45. The method in claim 43, wherein said received speech utterance comprises natural human speech, and said converting comprises natural language speech processing to extract said commands and data into a text or symbolic command and data form.

46. The system of claim 43, wherein the determining geographic location of interest of said end user consumer includes determining based on at least one of a telephone caller identification, a known location of the end user, an ability of the telephone to self-locate, an ability of the telephone to self locate including geographic location derived from a geographic positioning system (GPS), an ability of the telephone to self-locate based on cellular base station proximity or base-station to base-station handoffs, a spoken request of a location of interest, a spoken response to a prompt for a selection criteria, a spoken response including a spoken a city name, a spoken response including a spoken zip code, a spoken response including a location in a particular area of a city.

47. A method as in claim 43, wherein the geographically based recommendation comprises a geographically based recommendation of a business name and a business telephone number.

48. A method as in claim 43, wherein the geographically based recommendation comprises a geographically based recommendation of a business name and related business information selected from the set of related business information consisting of a business location, a business telephone number, a business type, a special incentive offered by the business, an information that distinguishes from other businesses, and combinations thereof.

49. A method as in claim 43, wherein the recommendation further includes a first short message that will be heard by a caller who request the recommendation.

50. A method as in claim 43, wherein the recommendation further includes a special promotion.

51. The method as in claim 43, wherein the recommendation further includes directions to a business location.

52. A method as in claim 43, wherein the recommendation is a recommendation to a restaurant having a requested type of cuisine.

53. A method as in claim 43, wherein the recommendation comprises a recommendation to a business or merchant selected from the set of businesses and merchants consisting of: a restaurant, a physician or surgeon, an auto parts business, an auto repair and service business, a pizza business or restaurant, an auto dealer, a department store, an attorney or lawyer, a dentist, a hospital, an insurance business, a beauty salon, a bank, a plumbing contractor, a florist, as well as many other types of businesses and services.

54. The method of claim 43, further comprising: providing an audio processed merchant good or service rating to an end user consumer requesting information with said speech utterance.

55. The method of claim 43, further comprising: validating a promotional audio coupon or discount offering by a merchant.

56. The method of claim 43, further comprising: generating a referral to a merchant having a predetermined rating.

57. The method of claim 43, further comprising:
providing an audio processed merchant good or service rating to an end user consumer requesting information with said speech utterance;
validating a promotional audio coupon or discount offering by a merchant; and
generating a referral to a merchant having a predetermined rating.

58. A method comprising:
receiving a speech utterance from a user from an audio-enabled communication device;
converting the speech utterance to text and extracting commands and optional data from said converted text;
determining a geographic location of interest of said user;
searching a database storing a plurality of data items including a merchant data item and at least one good or service data item associated with said merchant for a
particular one of said plurality of said data items in
response to said converted text-based command and
data, said searching including searching for a particular
data item having geographical context to the end user
consumer based on said determined geographic end
user consumer location of interest, said data item
having geographical context being selected from the set
consisting of: a geographically based
recommendations, a geographically-based promotion,
a geographically based audio coupon delivery, and
combinations thereof;

generating a speech-based representation of said particular data item identified in said database search;

serving said speech-based representation of said particular data item to said audio-enabled communication device; and communicating and validating a promotional audio coupon to the user at the time said speech-based representation is served to said communication device.

59. The method in claim 58, wherein said validating includes the system inserting a message to the merchant after the call has been connected to identify the caller as a valid service user and to validate the audio coupon.

60. A method comprising:

receiving a speech utterance from a user from an audio-enabled communication device;

converting the speech utterance to text and extracting commands and optional data from said converted text;

determining a geographic location of interest of said user;

searching a database storing a plurality of data items including a merchant data item and at least one good or service data item associated with said merchant for a particular one of said plurality of said data items in response to said converted text-based command and data, said searching including searching for a particular data item having geographical context to the end user consumer based on said determined geographic end user consumer location of interest, said data item having geographical context being selected from the set consisting of: a geographically based recommendations, a geographically-based promotion, a geographically based audio coupon delivery, and combinations thereof;

generating a speech-based representation of said particular data item identified in said database search;

serving said speech-based representation of said particular data item to said audio-enabled communication device; and receiving and collecting raw business rating inputs in the form of speech utterances from users, processing these speech uttered ratings inputs to generate compiled business ratings, and providing said processed business ratings to users in response to said speech utterances.

61. A method comprising:

receiving a speech utterance from a user from an audio-enabled communication device;

converting the speech utterance to text and extracting commands and optional data from said converted text;

determining a geographic location of interest of said user;

searching a database storing a plurality of data items including a merchant data item and at least one good or service data item associated with said merchant for a particular one of said plurality of said data items in response to said converted text-based command and data, said searching including searching for a particular data item having geographical context to the end user consumer based on said determined geographic end user consumer location of interest, said data item having geographical context being selected from the set consisting of: a geographically based recommendations, a geographically-based promotion, a geographically based audio coupon delivery, and combinations thereof;

generating a speech-based representation of said particular data item identified in said database search;

serving said speech-based representation of said particular data item to said audio-enabled communication device; and providing a consumer with a referral to a merchant having a predetermined rating using a referral service accessible via said communication device.

62. The method in claim 61, wherein said predetermined rating includes highly rated businesses.

63. A method comprising:

receiving a speech utterance from a user from an audio-enabled communication device;

converting the speech utterance to text and extracting commands and optional data from said converted text;

determining a geographic location of interest of said user;

searching a database storing a plurality of data items including a merchant data item and at least one good or service data item associated with said merchant for a particular one of said plurality of said data items in response to said converted text-based command and data, said searching including searching for a particular data item having geographical context to the user based on said determined geographic user location of interest, said data item having geographical context being selected from the set consisting of: a geographically based recommendations, a geographically-based promotion, a geographically based audio coupon delivery, and combinations thereof;

generating a speech-based representation of said particular data item identified in said database search;

serving said speech-based representation of said particular data item to said audio-enabled communication device; and providing a referral service accessible via an Internet web site interface operable to provide a consumer with a referral to a merchant having a predetermined rating.

64. The method in claim 63, wherein said predetermined rating includes highly rated businesses.

65. An operating model for a telephone-based audio-interfaced goods and services information and referral service having merchant self-promotion features, comprising:

storing merchant information, by an information database provider, said merchant information including a merchant identity information, at least one good or service associated with said merchant, and a merchant rating information;

receiving said merchant information into said database, via an audio merchant interface including a first telephone for inputting said merchant information into said database;

receiving audio consumer voice commands and audio consumer data via an audio consumer interface including a second telephone for inputting voice commands;

retrieving said merchant information, and optionally other information, from said database in response to said received consumer voice commands and data;

receiving and translating input voice commands, via a speech server separate from said merchant interface and said consumer interface, into a first symbolic command form using a speech-to-text conversion engine;

receiving and translating input voice commands into a first symbolic command form using a speech-to-text conversion engine in a speech server separate from said merchant interface and said consumer interface;

converting a retrieved second symbolic form data item into speech using a text-to-speech conversion engine in a speech server separate from said merchant interface and said consumer interface; and determining a geographic caller location of interest, and providing said goods and services information having geographical context to the caller based on said determined geographic caller location of interest, said information having geographical context being selected from the set consisting of: a geographically based recommendations, a geographically-based promotion, a geographically based audio coupon delivery, and combinations thereof.

66. A computer program product for use in conjunction with a computer system, the computer program product comprising a computer readable storage medium and a computer program mechanism embedded therein, the computer program mechanism, comprising a program module, the program module including instructions for:

receiving a speech utterance in the form of an electronic audio signal directly from an end user consumer from a telephone, the speech utterance including spoken voice input commands requesting an information on a merchant good or service from the end user consumer without requiring the end user consumer to provide any text or symbolic command representation for the request;

converting the speech utterance to text and extracting commands and optional data from said converted text;

determining a geographic location of interest of said end user consumer;

searching a database storing a plurality of data items including a merchant data item and at least one good or service data item associated with said merchant for a particular one of said plurality of said data items in response to said converted text-based command and data, said searching including searching for a particular data item having geographical context to the end user consumer based on said determined geographic end user consumer location of interest, said data item having geographical context being selected from the set consisting of: a geographically based recommendations, a geographically-based promotion, a geographically based audio coupon delivery, and combinations thereof;

generating a speech-based audio representation of said particular data item identified in said database search for playback over said telephone; and serving said speech-based representation of said particular data item to said telephone.

* * * * *